March 25, 1952  H. WAGNER ET AL  2,590,739
ORTHOPEDIC BONE ALIGNING AND FIXING MECHANISM
Filed July 26, 1949  4 Sheets-Sheet 1
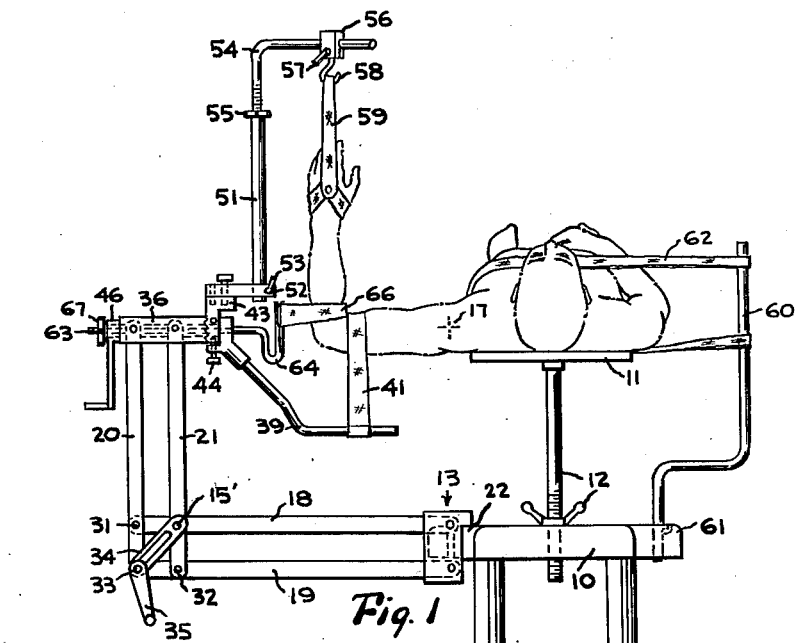
Fig. 1
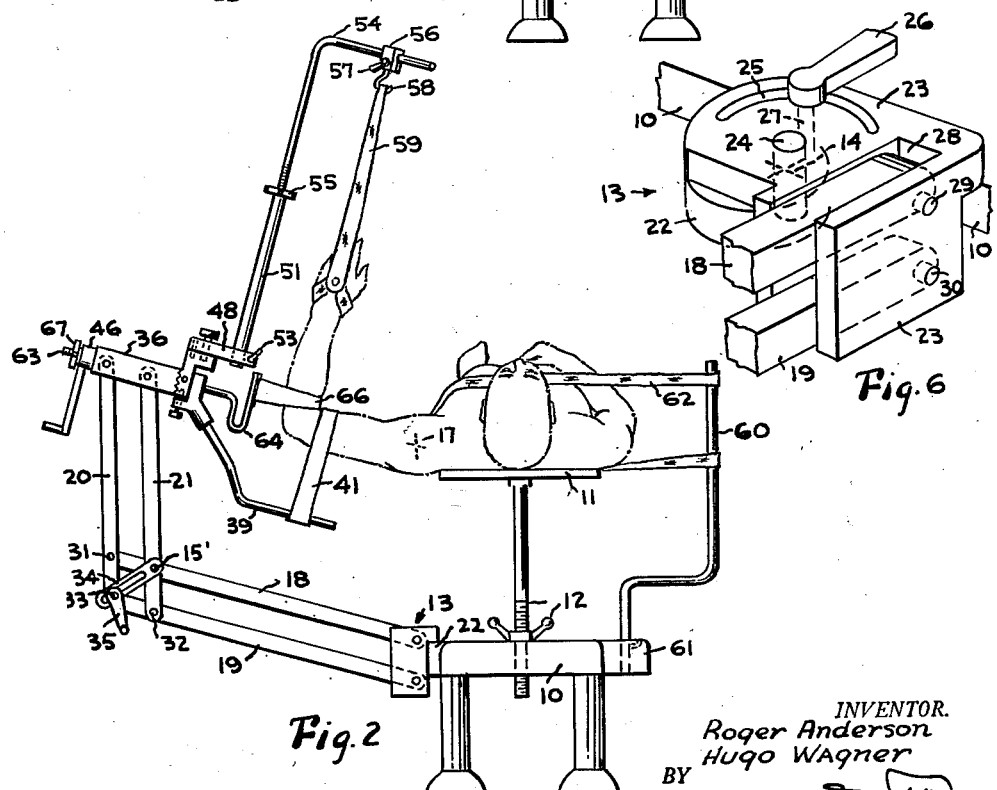
Fig. 2
Fig. 6
INVENTOR.
Roger Anderson
Hugo Wagner
BY
Arnold of Mathis
ATTORNEYS Inventor
Roger Anderson
Hugo Wagner
By Arnold and Mathu
Attorney Patented Mar. 25, 1952

2,590,739

UNITED STATES PATENT OFFICE 2,590,739

ORTHOPEDIC BONE ALIGNING AND FIXING MECHANISM

Hugo Wagner and Roger Anderson, Seattle, Wash.

Application July 26, 1949, Serial No. 106,955

6 Claims. (Cl. 128—84)

Our invention relates to an orthopedic bone aligning and fixing mechanism. More particularly, our invention relates to such a structure designed to be connected with the outer end portion of a bone of a patient, such as a humerus, which structure will both mechanically hold and cause desired movement of the bone. In our structure the centers of movement of the parts holding the bone and the said bone coincide, e g., the devices and the humerus both move about the joint of the humerus at the shoulder. Such devices so connected with the outer end portion of the humerus may provide the desired tension on the humerus and the said tension will be maintained uniform regardless of movements of the humerus and of the devices as the centers of movement thereof are about a common center. Thus, adjustment of a bone as to desired tension or manipulation may be mechanically obtained and without a subsequent adjustment adversely affecting an adjustment previously made. Also, a bone may be positioned suitably for operative purposes and before applying a cast the bone may be moved to a more convenient and desirable position for the application of a cast.

Other objects of the present invention are to provide for mechanically holding the outer end of the humerus while the humerus is being moved and with the center of movement of the humerus substantially free so as to eliminate interference by the devices in the way of the operator and to leave the humerus area open and readily accessible for any desired operation such as "open work" or for applying desired orthopedic braces.

Still other objects of our invention are to provide simple and efficient bone manipulating devices which not only move about the center of articulation of the bone involved, but which devices may be locked in any selected position so that when a desired adjustment obtains (this position may be observed by use of a fluoroscope) such position can be maintained by locking the devices against further movement.

Further objects of our invention are to provide a parallelogram device movable about two fixed centers and a bone aligning and fixing mechanism connected with said parallelogram so that the bone may move about a center which is defined by the apparatus and a center into which the center of movement of a bone can be readily positioned. Also, our said devices are characterized in that the center of movement about which said bone is maniplated is free from obstacles or mechanical apparatus which would interfere or limit the freedom of the operator.

The above mentioned general objects of our invention, together with others inherent in the same, are attained with devices illustrated in the accompaying drawings throughout which like reference numerals indicate like parts:

Figure 1 is an end elevational view illustrating structure embodying my invention and with a patient shown in one position by dot and dash lines;

Fig. 2 is a view similar to Fig. 1 except that the arm supporting device has been vertically angularly moved over the position thereof shown in Fig. 1;

Fig. 3 is a fragmentary plan view of the parts shown in Fig. 1 and with parts broken away in the interest of clarity;

Fig. 4 is a view similar to Fig. 3 except that the arm supporting device has been horizontally angularly moved over its position shown in Fig. 3;

Fig. 5 is a fragmentary view, partially in section, partially in end elevation, and on a larger scale, illustrating parts shown in Fig. 1 of the drawings and with the parts shown substantially in the same positions as they are shown in said Fig. 1;

Fig. 6 is a fragmentary detached perspective view of one of the supports shown in the previous figures;

Figure 7:
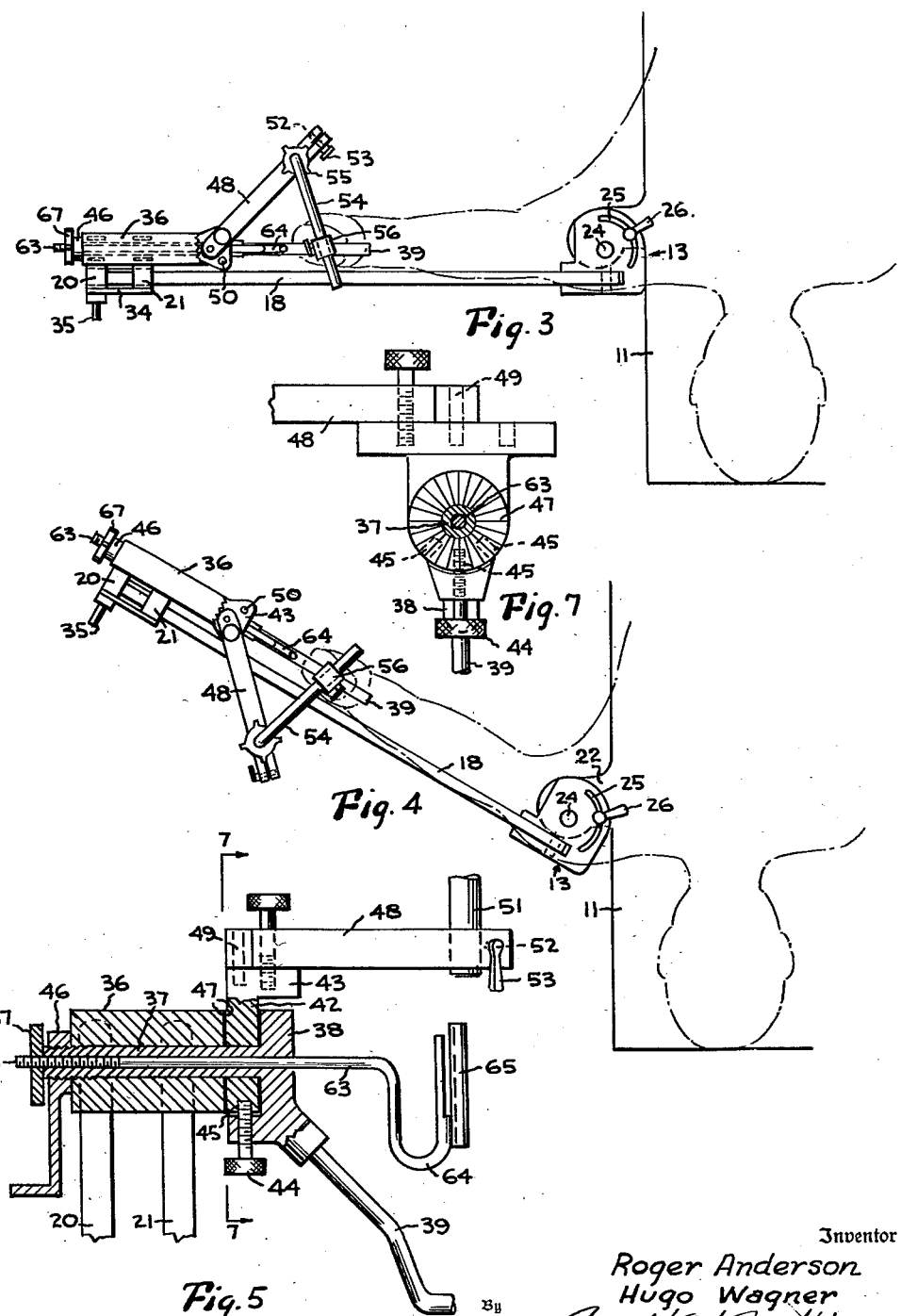
Fig. 7 is a detached fragmentary view, partially in section and partially in elevation, taken substantially on broken line 7—7 of Fig. 5.

Referring now to Figs. 1 and 2 of the drawings, 10 illustrates, somewhat schematically, a suitable table or support on which structure of our present invention may be mounted. In its simplest form, the table 10 need only provide leg members and a deck supporting portion, but may include a new standard surgical table such as that illustrated and described in the copending application of Roger Anderson, one of the applicants herein, Serial No. 622,786 issued August 2, 1949, under Patent No. 2,477,562, and said patent is hereinafter referred to as said co-pending orthopedic table patent. The patient is adjustably supported above the table 10 by any suitable means such as a table top 11. This may be accomplished by any suitable means such as threaded shaft and wing nut means 12. In many operations it is advisable to support the patient between the scapulae and at the occiput by the structure illustrated in said orthopedic table patent, and it is to be understood that the present invention is not to be limited to any particular manner of supporting the patient or to any particular apparatus to provide the desired vertical position of the patient.

The table 10 supports a joint means numbered generally 13 and an embodiment of which joint means is shown broken away and in perspective in Fig. 6 of the drawings. Regardless of the mechanical arrangements of the parts, the characteristic function of the joint means 13 is to provide for movement in both a horizontal as well as a vertical plane about a point aligned with the cross 14 (see Figs. 6 and 8).

Functionally the device herein operates because of the provision, in substance, of a parallelogram having pivotal points aligned with points 14, 15, 16 and 17 (Fig. 8) which are tied together and their relative positions maintained as will be hereinafter explained, so that the parallelogram is maintained regardless of universal movement of the points 15 and 16 relative to fixed points 14 and 17—that is, movements thereof in both or either vertical and horizontal planes. Parallel links or rods 18 and 19 instead of one link or rod 18 and pairs of parallel links or rods 20 or 21 instead of one link 21 are employed for purposes hereinafter defined. While the pivot points 14, 15 and 16 of the parallelogram are somewhat offset from the pivots 24, 15' and 16' as is hereinafter explained, the said points 14 to 17 illustrate in a general way functions involved.

Referring now to the joint means 13 shown detached in Fig. 6 of the drawings, an ear or lug 22 is fixed and carried by table 10. The lug or ear 22 protrudes sufficiently from table 10 so that the table 10 will not interfere with movements of the parts of the joint means 13. A frame structure 23 is pivoted to the ear or lug 22 by a vertical pivot rod means 24. Any adjusted movement of the frame structure 23 in a horizontal plane can be maintained by reason of: arcuate slot 25 in frame structure 23 and locking screw 27 threaded into lug 22. An operating arm 26 for screw 27 is provided. Thus frame structure 23 may be locked in an adjusted position as respects lug 22, and in turn, the table 10. The frame structure 23 pivotally supports links or rods 18 and 19 which may be accomplished by providing a recess 28 in the frame structure 23 and pivotally mounting links 18 and 19 on pivot rods 29 and 30. Thus the links 18 and 19 angularly move up and down and are guided by the walls of recess 28 as they move about their respective pivot rod mounting means 29 and 30. At the same time the rods 18 and 19 may angularly move in horizontal planes about pivot rod 24. Thus the center of articulation of the joint means 13 will be about a point where the horizontal plane passing through rod 29 intersects the line coaxial with the rod 24 and which point, for the purpose of illustration, was mentioned as point 14 hereinabove. This point of articulation is a fixed point.

The point 17 of the parallelogram is also a fixed point and is a point defined in space. The patient is raised or lowered and moved lengthwise or crosswise until the center of articulation of a bone, such as the proximal socket joint of a humerus, is aligned with said point. Obviously, the patient may be moved up or down by threaded shaft and wing nut means 12 relative the point 14 so that the vertical distance between points 14 and 17 can be determined and then a patient may be moved sideways or lengthwise so that the center of articulation of the socket joint toward the body of the patient on the inner end of the humerus can be aligned with said point 17. The point 17 and its method of determination will be hereinafter explained.

The outer ends of links or rods 18 and 19 are pivotally connected with links or rods 20 and 21 by pivot rods 31 and 15' and 33 and 32 respectively. A convenient manner of pivoting the outer end portion of a link 18 to pairs of links 20 and 21 is to position the link 18 intermediate the members forming each pair of said links 20 and 21 and to pivotally support the links by pivot rods 15' and 31. Similarly, the link 19 may be disposed between the members of each pair of links 20 and 21 and the parts are connected together by pivot rods 32 and 33. For the purpose of stability of the device after it has been locked against vertical movement, preferably an angularly positioned slotted link 34 connects between pivot rods 15' and 33. As any vertical movement of the parallelogram involved or comprising links 18, 19, 20 and 21 may be locked by locking any one corner or any one pivotal point of the parallelogram, we preferably employ a threaded pivot rod 33 and a threaded nut thereon which may have a readily manipulatable crank arm 35 forming part of said nut means. As the slotted link 34 spans between pivot means 15' and 33, locking of relative movement of said pivot means by said slotted link 34 and by said threaded nut carrying crank arm 35, will prevent vertical movement of the parallelogram. Thus upon loosening of the crank-nut 35 the parallelogram may be adjusted to any desired vertical position and thereafter such adjusted position may be maintained by tightening of crank-nut 35.

The upper end portions of the paired links 20 and 21 connect with a frame structure 36 (see also Fig. 5 of the drawings). The frame structure 36 is bored, and rotatably mounted in said bore is the shaft portion 37 of mounting block 38. The mounting block 38 carries an arm 39, to which may be pivotally attached a plate 40 (see Fig. 8). To plate 40 is adjustably connected a tensioning strap 41. The shaft portion 37 pivotally supports a sleeve portion 42 of a lug member 43 (see Fig. 5). Thus the mounting block 38 and the sleeve portion 42 can be angularly moved as a unit if said parts are secured together, and they may be moved separately if they are free to move relative to each other. The means to lock or unlock said parts comprises a set screw 44 threaded in mounting block 38 and with the inner end portion portion movable into a desired recess of the recesses 45 carried by the sleeve portion 42. After the mounting block 38 and sleeve portion 42 have been locked together by the set screw 44, the said sleeve portion 42 and the lug member 43 may be moved with the mounting block 38 as a unit by first loosening lock nut 46 by manipulation of the handle carried thereby. After the desired angular position is obtained (for example see Figs. 8 and 9 where said parts have been angularly moved approximately 90 degrees from one figure to the other), then the lock nut 46 may be tightened and the said parts will hold any adjusted position. The contacting faces of the sleeve portion 42 and the frame structure 36 are preferably provided with radial serrations 47 (Fig. 7) on their contacting surfaces which prevent relative angular movement between said parts when said parts are urged toward each other by the nut means 46.

The lug member 43 pivotally supports a bracket 48 by pivot means 49. Lug member 43 is provided with spaced holes, as holes 50 (see Figs. 3, 4 and 8). Thus the bracket 48 may be caused to assume the position shown in Fig. 3 or that shown in Fig. 4. This permits the bracket 48 to be moved to a position out of the way of the operator, and the position employed will depend upon the nature of the operation and, in turn, the position of the operator. The bracket 48 carries a tubular member 51. The outer end portion of the bracket 48 is split and a clamping screw 52 having a suitable operating handle 53 is provided to loosen and tighten said clamping screw and, in turn, relatively fix the tubular member 51 in the opening in the outer end portion of bracket 48. The tubular member 51 rotatively receives the threaded portion of an L-shaped bracket 54 (see Fig. 8). A nut member 55 rests on the tubular member 51 and threadedly engages the threaded portion of bracket member 54. The threaded portion of the L-shaped bracket 54 may be provided with a squared or patterned portion which interfits with a mating portion inside the tubular member 51 and thus the threaded portion of the bracket 54 is non-rotatable in the tubular member 51, but sliding longitudinal movement between the same is provided upon rotation of the nut member 55. The bracket 54 slidably receives a split block 56 and a clamping screw means 57 is provided so that the block 56 may be adjusted on the bracket 54 and then locked in any desired position. The block 56 carries a hook 58 and suitable sling means 59 may be employed to interconnect the hand or forearm of a patient with hook 58 and in turn, the bracket 54. Assuming the parts are in the position shown in Fig. 8 of the drawings, the sling 59 will provide tension upwardly on the forearm of a patient. Counter-tension against said tension on the forearm of a patient may be provided by tensioning strap 41, plate 40, and arm 39.

Figure 8:
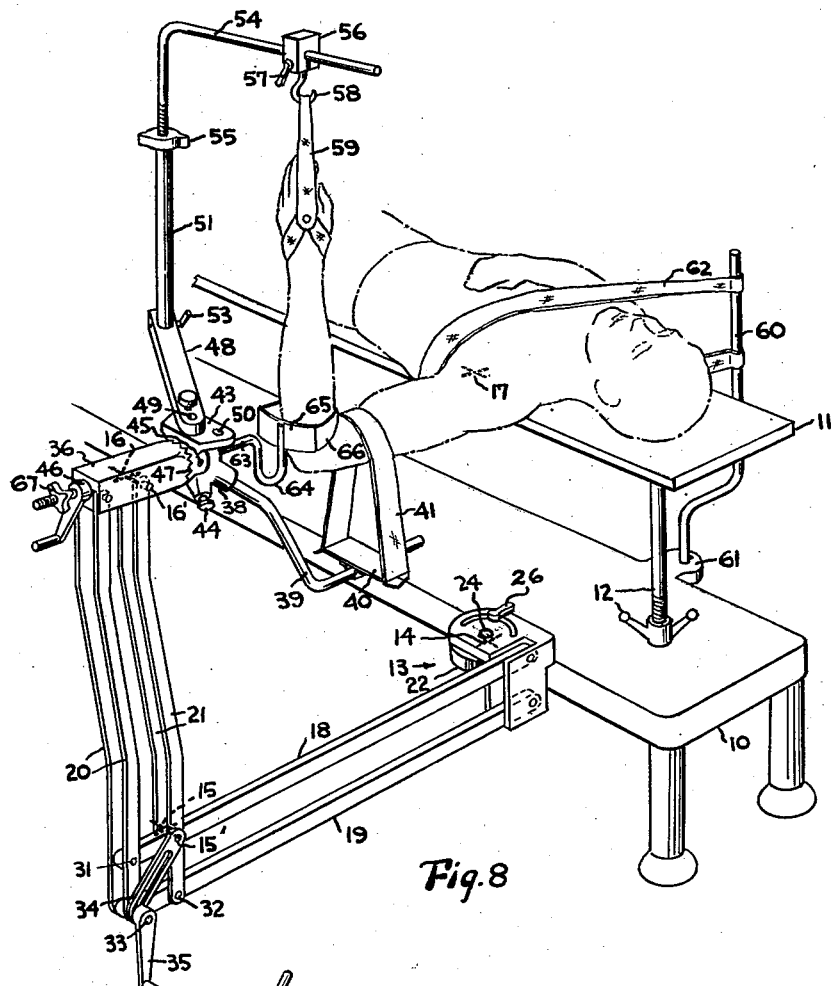
Fig. 8 is a fragmentary perspective view of structure shown in the previous figures and with the parts adjusted to hold the forearm of a patient substantially in a vertical plane and the humerus in a horizontal plane.

When a patient is in a position as indicated by Fig. 8 of the drawings, counter-tension resisting movement sideways of the patient may be provided by suitable means such as an arm 60 connected with the table 10 as through a lug 61 having an opening therein to receive a portion of said arm 60. A strap means 62 may pass around the chest of a patient in the bight of said strap 62 and the free end portions of said strap 62 may be connected to said arm 60. Traction on the humerus of the patient opposite to the counter-traction provided by strap 62 may be provided through rod 63. Rod 63 preferably terminates in a U-shaped portion 64. The outer end portion of said U-shaped portion 64 pivotally supports an arcuate strap plate 65. A strap 66 may be wrapped around the strap plate 65 and around the upper end portion of the forearm of the patient and thus a pull may be exerted through rod 63 to provide tension on the humerus of a patient and against the counter-traction provided by strap 62.

The rod 63 (see Fig. 5) is mounted for longitudinal movement in a bore in the mounting block 38 and in the shaft portion 37 thereof. A nut member 67 threadedly connects with a threaded portion of the rod 63. Thus upon movement of the nut 67 in one angular direction the rod 63 and parts connected therewith are moved away from the patient and thus provide tension acting through the humerus of a patient and against the counter-traction provided by the strap 62.

In said co-pending orthopedic table patent, and particularly in Figs. 41 to 43 thereof, apparatus is shown wherein reduction or similar holding of the parts of an arm or arms of a patient is involved. The present invention is designed to hold bones of the humerus or forearm and in a way so that if the humerus is properly positioned then thereafter suitable reduction or positioning of the forearm can be made without changing positions previously obtained in connection with the humerus and if the forearm has been properly positioned, adjustments may be made in the position of the humerus without changing previously adjusted positions of the forearm. For example, in Fig. 1 the forearm of the patient is indicated as being placed under desired tension through straps 59 and 41, and after such tensioning of the forearm it is indicated (Fig. 2) that the humerus may be angularly moved in a vertical plane and without changing previously made adjustments of the forearm. Similarly, movements can be made in a horizontal plane of the humerus, as is indicated in Figs. 3 and 4 of the drawings, and this without change of a previous setting obtained on the forearm. Obviously, movement in both horizontal and vertical directions can be obtained of the humerus and without changing a previous setting obtained on the forearm of a patient. If the forearm has been previously positioned as is indicated in Figs. 8 and 9 of the drawings, then the humerus can be rotated as is indicated in said figures and this without changing an adjustment which has been made previously on the forearm.

Figure 9:
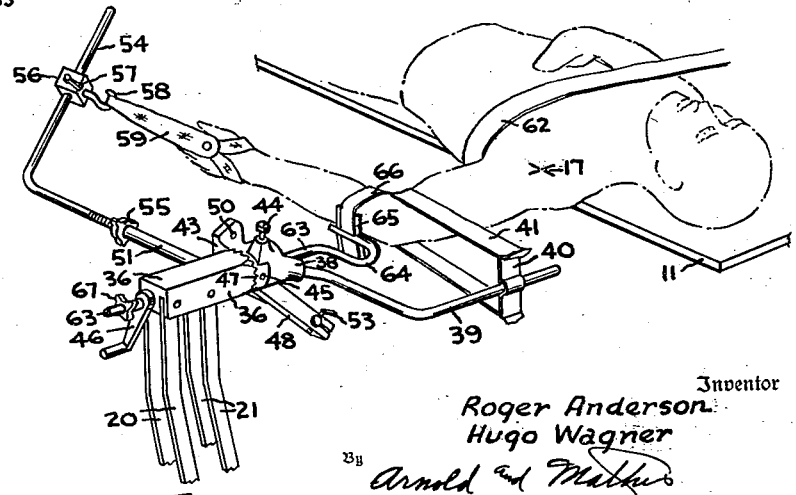
Fig. 9 is a fragmentary perspective view, similar to Fig. 8 except that further parts are broken away in Fig. 9 over Fig. 8 as the same are not deemed useful for the illustration of said Fig. 9, showing the forearm of a patient rotated about 90° over that shown in Fig. 8 but with the humerus in substantially the same position of Fig. 8.

In the event that the humerus is to be disposed substantially in a horizontal plane and the forearm of a patient is to be disposed substantially at right angles thereto, and in a horizontal plane all as best illustrated in Fig. 9 of the drawings, preferably the arm 39 and/or the arm 54 are somewhat elevated over the horizontal to provide a lifting component so that the anatomical axis of the humerus may be maintained in alignment with the axis of rod 63 without undue tension on said rod 63. As the mounting block 38 (see also Fig. 5) connected with arm 39 and the sleeve portion 42 connected with arm 54 are relatively movable when set screw 44 is unscrewed, a suitable angular relationship desired may be obtained and maintained.

Figure 10:
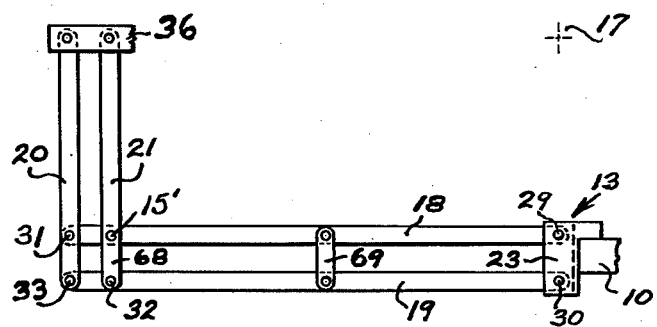
Fig. 10 is a somewhat schematic view to illustrate the mode of operation of the structure of this invention.

Referring now to the schematic drawing, Fig. 10, the links 18, 19, 20, and 21 are somewhat schematically shown. It is believed that from such schematic showing and the following description that this invention will be readily understood. The links 18 and 19 are connected to links 20 and 21 by pivot means 15', 31, 33 and 32. Also, the links 18 and 19 are connected with the pivotal means 13 by pivot means 29 and 30. Pivot means 13 is connected to a fixed support, as table 10. The link means 20 and 21 are pivotally connected with the bracket 36 which is shown broken away in said Fig. 10. Also, the pivot center 17 which coincides with the pivotal center of a bone, such as the proximal end portion of the humerus, is illustrated in said Fig. 10. Thus, the parts just described are those illustrated in the previous figures except the showing is more schematic.

Thus, in said Fig. 10 I have illustrated a parallelogram which involves links 18 and 19 pivotally connected by pivot means 29 and 30 to a support which is fixed against movement in one direction, such as in a horizontal plane. The outer ends of said links 18 and 19 are pivotally interconnected by a link portion 68 of the link 21 by pivot means 15' and 32. Obviously, the link portion 68 of the link 21 as well as the link 21 will be maintained parallel to the bracket portion 23 of the pivot means 13. The portion of the ink 21 extending above the links 18 and 19 may be considered as an extension of the link portion 68. Thus, if tension or compression is placed on the upper end portion of the link 21, such as where the same connects with bracket or frame structure 36, resistance to angular movement thereof is obtained through the parallelogram comprising links 18 and 19, link portion 68, and the frame structure 23. As bracket or frame structure 36 is pivoted to the link 21, the bracket or frame structure 36 would tend to move about its pivotal connection with link 21 unless provision is made to resist such movement. Preferably the said frame structure 36 is mounted so the same does not tend to pivot, but said frame structure 36 tends to maintain parallel to the links 18 and 19. This is accomplished by the provision of links 20 which are pivoted at one end portion to the frame structure 36 and are pivoted at their other end portions to the links 18 and 19 by pivot means 31 and 33. Thus, by the use of links 20 and 21 in the manner described, or pairs thereof, the frame structure 36 is maintained parallel to the links 18 and 19 even though tension is placed on said frame structure 36. When tension is placed on the rod 63 (see also Fig. 5) when said member 36 is placed under tension through said rod 63 as described, the link 18 is placed under compression while the link 19 is placed under tension. If the rod 18 is of a size that it tends to bend when under the compression mentioned, the said link 18 may be reinforced by link 69 which is parallel to the link portion 68 and which link 69 is pivoted at its end portions to links 18 and 19. Thus, when link 18 is under compression and tending to bend, link 19 is under tension and the link 69 will thus permit link 19 to reinforce link 18.

As a leg bone, as a femur, and an arm bone, as a humerus, will vary in length it will be necessary to provide for adjustable length between the pivot point 17 and adjacent end portion of the frame structure 36. At the same time the frame structure 36 should be as long as possible as it is a relatively rigid structure resisting sagging while the connection through a bone between the outer end portion of frame structure 36 and the point 17 may be relatively limp or non-rigid due to flexible strap connections between the rod 63 and the bone and also due to the fact that the bone may be broken. Thus, we preferably provide for means to relatively adjust the lengths of the links 18 and 19 as respects the length of the frame structure 36.

Figure 11:
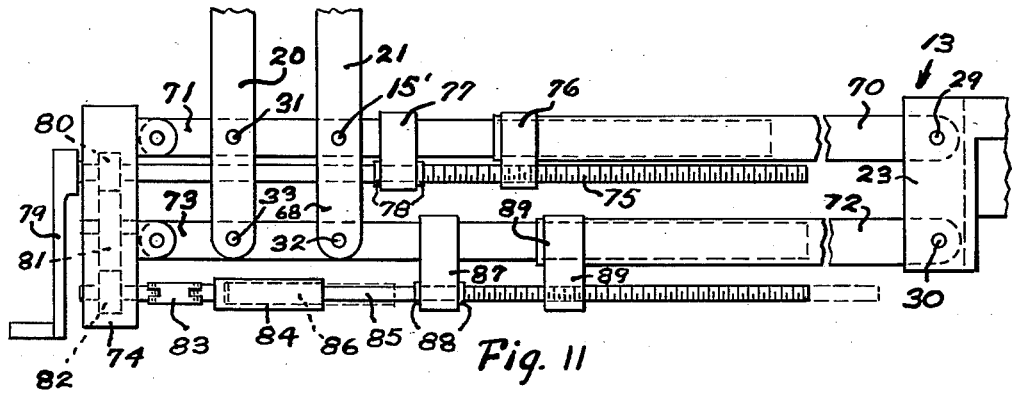
Fig. 11 is a fragmentary elevational view of a modified form of this invention.
Figure 12:
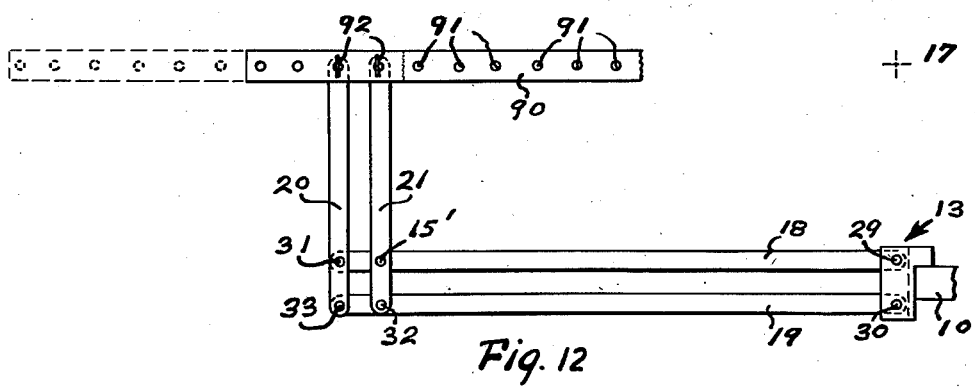
Fig. 12 is a fragmentary elevational view of a still further modified form thereof.

Such relative adjustment may be accomplished by means of the structure illustrated in Fig. 11 of the drawings where the links 18 and 19 are adjustable conjointly as to length or by the construction shown in Fig. 12 of the drawings where the frame structure 36 is adjustable in length.

Referring to Fig. 11 of the drawings, the link 18 is illustrated by link portions 70 and 71 while the link 19 is illustrated by link portions 72 and 73. As the link portions 70 and 72 may be pivotally connected to the pivot means 13, the numerals 13, 23, 29 and 30 are applied to appropriate parts. The links 20 and 21 are preferably connected to the link portions 71 and 73 so we have the same mode of operation as described in connection with the previous figures and hence numerals 20, 21, 31, 15', 33, 32 and 68 are thus applied to Fig. 11 of the drawings. A housing 74 is pivotally connected to link portions 71 and 72. A threaded shaft 75 threadedly engages a boss 76 which is carried by link portion 70 and link portion 70 telescopically interfits with and slidably receives link portion 71. Boss 77 is carried by link portion 71. Sleeves 78 are rigid on shaft 75 and thus boss 77 and sleeves 78 provide a mounting means for the shaft 75 permitting rotary movement of said shaft 75 and preventing longitudinal movement thereof. Rotary movement to the shaft 75 may be imparted through crank means 79, non-rotatably carried by said shaft 75. Upon rotary movement of shaft 75 in one direction bosses 76 and 77 move toward each other and in turn the effective length of link 18 through link portions 70 and 71 is shortened. Movement of the bosses 76 and 77 away from each other causes movement of the link portions 70 and 71 in the opposite direction and thus the effective length of the link 18 is lengthened.

At the same time the effective length of the link 18 is being manipulated rotary motion of the shaft 75 is imparted through gears 80, 81 and 82, universal joint means 83 and sleeve 84 to shaft 85. Sleeve 84 carries an internally recessed patterned portion which slidably interfits with the pattern portion 86 of the shaft 85 so that the shaft 85 may longitudinally move relative to the sleeve 84 as the link structure moves in a vertical plane, such as the movement indicated by the positions shown in Figs. 1 and 2 of the drawings and at the same time to maintain a non-rotative relative fit between the sleeve 84 and the shaft 85. A boss 87 which may be similar to the boss 77 is carried by the link portion 73 and the same interfits between sleeves 88 which may be similar to sleeves 78. The shaft 85 threadedly interconnects with a boss 89 which boss 89 may be similar to the boss 76 and which boss 89 is carried by the link portion 72. Thus by angular movement in the appropriate direction of the crank means 79 the effective lengths of the links 18 and 19 between pivot means 29 and 15' and between pivot means 30 and 32 may be simultaneously lengthened or shortened. By having the bosses 76, 77, 87 and 89 extending in opposite directions, as indicated in Fig. 11 of the drawings, maximum space is provided between the link portions 70, 71, 72 and 73 forming the links 18 and 19, and this is desirable as the links 18 and 19 move toward and away from each other as the parallelogram moves in a vertical direction.

Referring now to Fig. 12 of the drawings, the following parts have the same functions as heretofore mentioned and hence are given similar numbers: table 10, pivot means 13, links 18, 19, 20 and 21, and pivot means 29, 30, 15', 32, 31 and 33. In Fig. 12 the chief modification is to illustrate a means whereby the effective length of 36 toward the pivotal point 17 may be varied. In such form a bracket or rod 90 having a plurality of longitudinally spaced openings 91 is illustrated. Said rod 90 rigidly carries the frame 36 and parts connected therewith by any suitable means (not shown) and thus we in effect provide for extension or contraction of the length of frame structure 36 as desired. Said rod 90 is pivotally detachably connected with links 20 and 21 by any suitable means, such as by pivot means having wing nuts 92 thereon. Thus wing nuts 92 may be removed and the rod 90 placed in its full line or dotted line position as is indicated in Fig. 12 of the drawings and the effective length of the rod 90, so far as the pivotal center 17 is concerned will be such that the construction will be adapted for use in connection with an arm when the parts are in the full line position and for a leg when the parts are in the dash line position. The various holes also indicate variations so that different length arms or legs will interfit with the apparatus and at the same time the effective length of the rod 90 (which is an illustration of the frame structure 36 of the previous figures and parts associated therewith) can be varied to maintain as long a rod as possible and with a minimum length of the portion of the upper link of the parallelogram which includes the bone of the patient and the means which connect the same with rod 63 and which rod 63 in turn connects the same with the frame structure 36.

The links or rods 20 and 21 carry offset portions intermediate their length so that the frame structure 36 (see Figs. 3 and 4) is relatively offset as respects the links 18 and 19. The offset portions just mentioned are well illustrated in Fig. 8 of the drawings. Also it is to be noted that by reason of the frame structure 23 (see Fig. 6), the arms 18 and 19 move angularly in a plane, passing through the vertical axis of rod 24 which is offset in the same direction as the offset in links 20 and 21. Thus in effect we have a gooseneck type of structure where we start from the vertical axis of pivot rod 24, then extend toward the viewer as respects Fig. 6 of the drawings until we reach links 18 and 19, and after reaching links 20 and 21 there is an offset portion so that at the time we reach frame structure 36 we are back in the same vertical plane as we started with pivot rod 24. The frame structure 36 is pivoted to links 20 and 21 and the upper leg of one parallelogram comprises, in effect, the frame structure 36 and the humerus of the patient which is aligned with the axis thereof, namely, the axis of rod 63. This parallelogram is maintained by reason of the parallelogram involving links 18 and 19, links portion 68 and frame structure 23 as described in connection with Fig. 10. In order to properly position a patient, the patient is moved either up or down with the table top 11 and then the proximal end of the humerus or the end defined by the socket joint at the shoulder of the patient is aligned vertically in the plane of pivot rod 24 and then aligned both crosswise and lengthwise so that the humerus forms the part of the upper leg of the parallelogram, and the socket joint at the shoulder area of the humerus is aligned to have its center of articulation aligned with the intersection of a vertical line co-axial with the pivot rod 24 and a horizontal line coincident with the longitudinal axis of the frame structure 36. Obviously, as the rods 20 and 21 are lengthened or shortened the point 17 will change and the patient must be moved so that the elevation of the center of articulation of the socket joint of the humerus at the shoulder level will align with point 17. In other words, no particular length need be involved in the rods 20 and 21 as the patient may be adjusted to compensate for any particular length of links or rods 20 and 21 as may be desired.

From the foregoing it will be apparent that one link of a parallelogram is defined by a rod 18. The end of said link toward the table 10 is mounted on said table 10 by the joint means generally numbered 13. The center of articulation of said joint 13 is defined by the vertical pivot rod 24 and the horizontal pivot rod 29. These two rods coincide with a point 14 which will be the center of articulation of the rod 18. This center is somewhat offset and in a direction towards the feet of the patient as appears in Fig. 8 of the drawings. Next, the rod 18 is pivoted through pivot means 15' to links 21. As links 21 have a bent portion intermediate their lengths, the upper portions of links 21 lie in a vertical plane passing through vertical pivot 24. Thus the offset brought about by the fact that link 18 does not lie in the plane of pivot rod 24 is overcome by said offset portions in the links 20 and 21. Obviously, a joint means could be designed not employing said offsets but we find that such construction has practical manufacturing advantages and without any disadvantages. By having the arms 18 and 19 offset as respects the humerus of a patient, advantages result; for example, a true anterior-posterior radiographic view may be made of a humerus and there are no objects aligned with the humerus to mask the radiographic view. The third leg of the parallelogram is defined by the frame structure 36 which is pivoted to links 20 and 21 and the humerus of the patient. When the apparatus is in use as illustrated in the various views, this third leg of the parallelogram is relatively stiff and rigid and little play or undesired movement obtains due to links 19 and 20 as previously explained. The fourth leg of the parallelogram defines supporting means between the points 17 and 14 and which leg is parallel with the leg formed by the links 20 and 21. This last leg of the parallelogram involves the patient, the table top 11, the supporting structure between the table top 11 and the table 10, the table 10, and frame structure 23 to reach point 14.

In view of the fact that one leg of the parallelogram and the leg of the parallelogram which includes a bone, such as the humerus, articulates about a point coinciding with the center of articulation of the humerus at the shoulder bone level, we are able to provide any desired tension on a humerus and to maintain such tension while manipulating the humerus. Thus, if there is a fracture of the humerus and the distal fragment is overlapped or has passed the distal end of the superior fragment at the fracture area, we can first apply sufficient tension to eliminate "overriding" and then manipulate the humerus to get desired anatomical alignment of the fragments.

Also where the humerus is adjustable by means secured to the outer end portion thereof, the humerus is available for reduction or open surgical work and all this with substantially no interference to the operator by having devices in his way. Thus whether the operator is doing "open work" on a humerus or whether the operator is applying a cast thereto, the apparatus is not in the way of the operator. Structure in the way of an operator not only is a matter of inconvenience but it is a matter of much greater importance in that more precise technic may be employed and desired results may be obtained if the operator is not hampered by interfering obstacles and mechanical devices. Also because of the fact that a bone is held in a selected position by apparatus moving about the same center as the bone, the apparatus in many instances may be in one position for operations and in another for applying a cast. For example, if a forearm is being adjusted, the position shown in Fig. 8 may be a more convenient operative position and the position shown in Fig. 9 may be a more convenient cast applying position. Many other such comparative positions obviously exist where changes in positions can be made without altering or adjusting a desired bone position.

From the foregoing descripion and as best illustrated in Fig. 8 of the drawings, links, as links 18 and 19, may be offset from their axes of movement and similarly links 20 and 21 may have offset portions so their axes of movement do not lie in the plane of the links. Thus, reference is made to the axes of movement of various links being parallel rather than the links being parallel.

In our invention we thus provide a fixed pivot supporting means in the nature of the joint 13. This pivot supporting means 13 supports link means comprising two links 18 and 19. The links 18 and 19 are supported by the pivot support means 13 for movement in both vertical and horizontal planes. The outer end portions of the first link means 18—19 pivotally support a second link means which preferably comprises two members 20—21. By having the first link means comprising two link member 18 and 19 and having the said link means 18 and 19 pivoted to a link 20 or 21, the members 18 and 19 in combination with the portion of the link 20 or 21 therebetween will cause the link member 20 or 21 to maintain a desired vertical angular position regardless of movement of the members 18 and 19. In the event that the second link means comprises two members 20 and 21 each pivotally connected with the first link means comprising links 18 and 19, then the third link means comprising member 36 may be maintained parallel to the first link means comprising links 18 and 19. Connected with the third link means 36 is the rod 63 which functions as a patient engaging means to provide traction on a patient relative to counter-traction provided by the strap 62. The rod 63 is relatively, longitudinally adjustable by parts previously discussed. After the various links have been adjusted and the patient has been positioned so that the point 17 representing the joint of articulation of the proximal end of a bone of a patient, then the parts of the apparatus can be locked in place by locking the pivotal connection between either the first link means and the pivotal support 13, or between the first and second link means, or between the second and third link means. As an illustration thereof we have shown the slotted link 34 which spans between pivot means 15' and 33. The straps 62 and 66 align the anatomical axis of a bone, such as a humerus, with the axis of the third link means 36. Preferably, to aid in such alignment, straps 41 and 59 and parts associated therewith are employed to provide for a desired elevation. Also the threaded shaft and wing nut 12 or functionally similar apparatus are employed to provide the desired elevation so that the proximal end of a bone, such as the humerus, is aligned with the point 17 so that the center of articulation of the bone and the point 17 coincide.

Obviously, changes may be made in the forms, dimensions and arrangements of the parts of this invention without departing from the principle thereof, the above setting forth only preferred forms of embodiment.

We claim:

1. In a mechanical bone manipulating device, a fixed pivot support means; first link means pivotally connected at one end portion to said fixed pivot support means and angularly movable in vertical and horizontal planes about said fixed pivot support, said first link means comprising a plurality of spaced links having parallel axes and each mounted independently and pivotally movable in a vertical plane; second link means angularly disposed to said first link means and pivotally connected at one end portion thereof to the other end portions of each of said links of said first link means for movement in the vertical plane of movement of said first link means; a third link means axially parallel to and of a lesser length than said first link means and pivotally connected to the other end portion of said second link means for movement of its axis in the same plane as said second link means, the axes of the pivots of said first, second and third link means being parallel; and patient engaging means connected at one end portion with said third link means and adapted to be connected at its other end portion with the patient at the area of the outer or distal end of a bone of a patient, whereby if the center of articulation of the bone of the patient is aligned with the center of the fourth corner of a parallelogram comprising said first, second and third link means, the device and the said bone of the patient may move together about the center of articulation of the said bone of the patient.

2. The combination of claim 1 wherein said second link means comprises a plurality of independently mounted interconnected spaced links having parallel axes which tend to maintain the axis of the third link means parallel to the axis of the first link means.

3. The combination of claim 1 wherein the first and second link means are detachably interconnected by a slotted diagonally disposed link.

4. The combination of claim 1 wherein the patient engaging means comprises a rotatable and adjustable extension rod coaxial with said third link means and said patient engaging means further comprises spaced apart tension means adapted to engage a patient at substantially opposite directions to aline and fix the anatomical axis of the patient's bone with the axis of said third link means.

5. The combination of claim 1 wherein releasable locking means are disposed between at least two of said link means for locking the same against relative angular movement.

6. In a mechanical bone manipulating device, a fixed pivot-support means; first link means pivotally connected at one end portion to and offset to one side as respects said fixed pivot-support means and angularly movable in vertical and horizontal planes about said fixed pivot-support, said first link means comprising a plurality of spaced links having parallel axes, and each mounted independently and pivotally movable in a vertical plane; second link means angularly disposed to said first link means and pivotally connected at one end portion thereof to the other end portions of each of said links of said first link means for movement in the vertical plane of movement of said first link means, said second link means being offset to the other side as respects said first link means and aligned with said fixed pivot support means; a third link means axially parallel to and of a lesser length than said first link means and pivotally connected to the other end portion of said second link means for movement of its axis in the same plane as said second link means, the axes of the pivots of said first, second and third link means being parallel; and patient engaging means connected at one end portion with said third link means and adapted to be connected at its other end portion with the patient at the area of the outer or distal end of a bone of a patient, whereby if the center of articulation of the bone of the patient is aligned with the center of the fourth corner of a parallelogram comprising said first, second, and third link means, the device and the said bone of the patient may move together about the center of articulation of the said bone of the patient.

HUGO WAGNER.
ROGER ANDERSON.

REFERENCES CITED

The following references are of record in the file of this patent:

UNITED STATES PATENTS

| Number | Name | Date |
| --- | --- | --- |
| 2,014,111 | Longfellow | Sept. 10, 1935 |
| 2,124,102 | Bell | July 19, 1938 |
| 2,204,266 | Wilcox | June 11, 1940 |

FOREIGN PATENTS

| Number | Country | Date |
| --- | --- | --- |
| 538,070 | Great Britain | July 18, 1941 |